US011755679B2

(12) United States Patent
Wu (10) Patent No.: US 11,755,679 B2
(45) Date of Patent: *Sep. 12, 2023

(54) SERVICE EXECUTION METHOD AND DEVICE (71) Applicant: ADVANCED NEW TECHNOLOGIES CO., LTD., George Town (KY)

(72) Inventor: Chao Wu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/825,113

(22) Filed: May 26, 2022

(65) Prior Publication Data
US 2022/0300568 A1 Sep. 22, 2022

Related U.S. Application Data (63) Continuation of application No. 16/123,897, filed on Sep. 6, 2018, now Pat. No. 11,347,825, which is a
(Continued)

(30) Foreign Application Priority Data

Mar. 7, 2016 (CN) .......................... 201610126319.8

(51) Int. Cl.
G06F 15/16 (2006.01)
G06F 16/958 (2019.01)
(Continued)

(52) U.S. Cl.
CPC .......... *G06F 16/958* (2019.01); *G06F 9/445* (2013.01); *G06F 9/44505* (2013.01);
(Continued)

(58) Field of Classification Search
CPC .............................. G06F 16/958; H04L 67/02
See application file for complete search history.

(56) References Cited

U.S. PATENT DOCUMENTS 8,300,620 B1   10/2012   Sarkar et al.
8,589,955 B2   11/2013   Roundtree et al.
(Continued)

FOREIGN PATENT DOCUMENTS

CN      1547144      11/2004
CN    102929947       2/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hieu T Hoang
(74) *Attorney, Agent, or Firm* — Fish & Richardson P.C.

(57) ABSTRACT

Techniques for providing a service execution method and device are described. A request is received from a browser of a client device. A web page is determined from the received request. The web page is transmitted to the client device to wake up a designated application of the client device. A service execution request is received from the designated application of the client device. The received service execution request is determined to correspond to the received request. In response to determining that the received service execution request corresponds to the received request, a service is executed based on the received service execution request.

20 Claims, 7 Drawing Sheets

Related U.S. Application Data continuation of application No. PCT/CN2017/074321, filed on Feb. 21, 2017.

(51) Int. Cl.
  *G06F 16/957*  (2019.01)
  *G06F 9/445*  (2018.01)
  *H04L 67/60*  (2022.01)
  *H04L 67/02*  (2022.01)

(52) U.S. Cl.
  CPC ........ *G06F 16/9574* (2019.01); *G06F 16/972* (2019.01); *H04L 67/02* (2013.01); *H04L 67/60* (2022.05)

(56) References Cited

U.S. PATENT DOCUMENTS

| | | | |
|---|---|---|---|
| 11,347,825 | B2 | 5/2022 | Wu |
| 2002/0055933 | A1 | 5/2002 | Feathers et al. |
| 2002/0188562 | A1 | 12/2002 | Igarashi et al. |
| 2004/0255203 | A1 | 12/2004 | Miyoshi |
| 2006/0168504 | A1 | 7/2006 | Meyer et al. |
| 2009/0210765 | A1 | 8/2009 | Henocq et al. |
| 2010/0130164 | A1 | 5/2010 | Chowdhury et al. |
| 2011/0035435 | A1 | 2/2011 | Meng et al. |
| 2011/0154145 | A1 | 6/2011 | Lomnitz |
| 2011/0246369 | A1 | 10/2011 | de Oliveira |
| 2012/0066090 | A1 | 3/2012 | Gangapurkar |
| 2012/0131408 | A1 | 5/2012 | Tada et al. |
| 2012/0158580 | A1 | 6/2012 | Eram |
| 2012/0191569 | A1 | 7/2012 | Shah |
| 2012/0254429 | A1 | 10/2012 | Feng et al. |
| 2013/0013499 | A1 | 1/2013 | Kalgi |
| 2013/0013668 | A1 | 1/2013 | Kodaka et al. |
| 2013/0246528 | A1 | 9/2013 | Ogura |
| 2014/0058951 | A1 | 2/2014 | Kuppuswamy |
| 2014/0114846 | A1 | 4/2014 | Weiner |
| 2014/0282497 | A1 | 9/2014 | Farm et al. |
| 2015/0058222 | A1* | 2/2015 | Kritzinger ............ G06Q 20/325 705/44 |
| 2015/0066682 | A1 | 3/2015 | Scipioni |
| 2015/0188871 | A1 | 7/2015 | Lewis |
| 2015/0213542 | A1 | 7/2015 | Wallaja |
| 2015/0215983 | A1 | 7/2015 | Huang et al. |
| 2015/0310430 | A1 | 10/2015 | Goldstone |
| 2016/0098699 | A1 | 4/2016 | Pandey |
| 2016/0239837 | A1 | 8/2016 | Klingen |
| 2018/0047089 | A1 | 2/2018 | Yang et al. |
| 2018/0270024 | A1 | 9/2018 | Neuhaus et al. |
| 2018/0302172 | A1 | 10/2018 | Petrioli et al. |
| 2018/0365256 | A1 | 12/2018 | Wu |

FOREIGN PATENT DOCUMENTS

| | | |
|---|---|---|
| CN | 103049320 | 4/2013 |
| CN | 103093339 | 5/2013 |
| CN | 103106575 | 5/2013 |
| CN | 103106576 | 5/2013 |
| CN | 103646211 | 3/2014 |
| CN | 103839156 | 6/2014 |
| CN | 104462478 | 3/2015 |
| CN | 104869135 | 8/2015 |
| JP | 2002215622 | 8/2002 |
| JP | 2011155458 | 8/2011 |
| KR | 20130017633 | 2/2013 |
| KR | 20140035225 | 3/2014 |
| KR | 20140092172 | 7/2014 |
| KR | 20150083334 | 7/2015 |
| KR | 20150110743 | 10/2015 |
| TW | 201525906 | 7/2015 |
| WO | WO 2017050069 | 3/2017 |

OTHER PUBLICATIONS

Extended European Search Report in European Application No. 17762439.2, dated Sep. 19, 2019, 6 pages.

International Search Report by the International Searching Authority issued in International Application No. PCT/CN2017/074321 dated Jun. 1, 2017; 9 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/074321, dated Sep. 11, 2018, 7 pages (with English translation).

PCT Written Opinion of the International Searching Authority in International Application No. PCT/CN2017/074321, dated Jun. 1, 2017, 6 pages (with English translation).

* cited by examiner

SERVICE EXECUTION METHOD AND DEVICE

CROSS-REFERENCE TO RELATED APPLICATIONS

This application is a continuation of U.S. application Ser. No. 16/123,897, filed Sep. 6, 2018, which is a continuation of PCT Application No. PCT/CN2017/074321, filed on Feb. 21, 2017, which claims priority to Chinese Patent Application No. 201610126319.8, filed on Mar. 7, 2016, and each application is hereby incorporated by reference in its entirety.

TECHNICAL FIELD

The present application relates to the field of information technologies, and in particular, to a service execution method and device.

BACKGROUND

As the information society develops, users are increasingly accustomed to performing services over networks. With the development and popularity of mobile devices, users start to perform services more often by using mobile devices (such as mobile phones and tablets), instead of being limited to only personal computers (PCs).

However, because mobile devices have various operating systems and system versions, it costs a lot to develop dedicated applications (apps) corresponding to the systems and versions to execute services.

Therefore, in the existing technology, to reduce the costs, a service is provided in the form of a web page in a browser of a mobile device, or an app is developed by using the browser of the mobile device as a kernel to provide a service, instead of developing a dedicated app for the mobile device. Although the app developed by using the browser of the mobile device as a kernel is not called a browser, it functions the same as a browser: it executes services by receiving web page connections, invoking web page information, displaying web pages, sending information based on detected operations, etc. The app is essentially a browser of a mobile device.

However, because malicious plug-ins can be easily installed in a browser, a risk of a browser hijack by a malicious user is usually high. Consequently, security-related information (such as MAC addresses, Wi-Fi addresses, and geographic location information) transmitted through the browser can be easily tampered by the malicious user, thus reducing security of services executed through the browser. Therefore, to resolve the problem, a method for using another security service platform to monitor an executed service, store resources, and verify a user identity is usually used to ensure security of resources involved in service execution.

However, when using the security service platform through a web page, the user usually needs to log in to a corresponding account on the security service platform, resulting in complex user operations. Moreover, when a page of the security service platform is displayed through the browser, a local verification service (such as a biometric information verification service) for mobile devices provided by the security service platform cannot be supported. Therefore, security and convenience of service execution are affected.

If the user wants to obtain complete services provided by the security service platform when the services are executed through a browser, the browser needs to integrate a software development kit (SDK) of the security service platform and use the SDK to wake up a local app of the security service platform on the mobile device, to ensure the security of the resources involved in service execution. It imposes a new requirement on the browser when the services are executed through the browser.

It can be seen that, in the existing method for executing a service by displaying a web page through a browser, service execution efficiency is low due to inconvenient user operations and high requirement for the browser.

SUMMARY

Implementations of the present application provide a service execution method and device to resolve the following problem in the existing technology: in a method for executing a service by displaying a web page through a browser, service execution efficiency is low due to inconvenient user operations and high requirement for the browser.

An implementation of the present application provides a service execution method, including: receiving, by a server, a web page service request sent by a terminal device; returning a web page to the terminal device based on the web page service request, so the terminal device wakes up a designated application (app) by using the web page; receiving a service execution request that is sent by the app and that corresponds to the web page service request; and executing a service based on the service execution request.

An implementation of the present application provides a service execution method, including: sending a web page service request to a server; receiving a web page that is returned by the server based on the web page service request; and waking up a designated app by running the web page, so the app sends a service execution request corresponding to the web page service request to the server, and the server executes a service based on the service execution request.

An implementation of the present application provides a service execution device, including: a first receiving module, configured to receive a web page service request sent by a terminal device; a returning module, configured to return a web page to the terminal device based on the web page service request, so the terminal device wakes up a designated app by using the web page; a second receiving module, configured to receive a service execution request that is sent by the app and that corresponds to the web page service request; and an execution module, configured to execute a service based on the service execution request.

An implementation of the present application provides a service execution device, including: a sending module, configured to send a web page service request to a server; a receiving module, configured to receive a web page returned by the server based on the web page service request; and a wakeup and execution module, configured to wake up a designated app by running the web page, so the app sends a service execution request corresponding to the web page service request to the server, and the server executes a service based on the service execution request.

The implementations of the present application provide the service execution method and device. In the method, the server returns the corresponding web page based on the web page service request sent by the terminal device, so the terminal device wakes up the designated app by using the web page, and the app sends the service execution request corresponding to the web page service request. Eventually, the server executes the service based on the service execution request. According to the method, even if a browser sending the web page service request does not integrate an SDK of the designated app, the designated app can still be woken up by running the received web page, and the service can be executed by using the app and the server. It can effectively improve convenience of user operations, reduce the requirement for a browser app during service execution, and improve service execution efficiency.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF EMBODIMENTS

In the implementations of the present application, a server receives a web page service request sent by a terminal device (that is, a web page service request initiated by using a browser, or a web page service request initiated by an application (app) having a browser kernel), and returns a web page to the terminal device. Then a designated app on the terminal device is woken up, and the app sends a service execution request corresponding to the web page service request (that is, the service execution request sent by the designated app replaces the web page service request). Eventually, the service executes a service based on the service execution request. It can be seen that, in the method described in the present application, when the service is executed by using the web page, the designated app can be simply and effectively woken up, and the app and the server can complete service execution together. As such, user operations are more convenient, and service execution efficiency is higher.

To make the objectives, technical solutions, and advantages of the present application clearer, the following clearly and completely describes the technical solutions of the present application with reference to the implementations of the present application and corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

Figure 1:
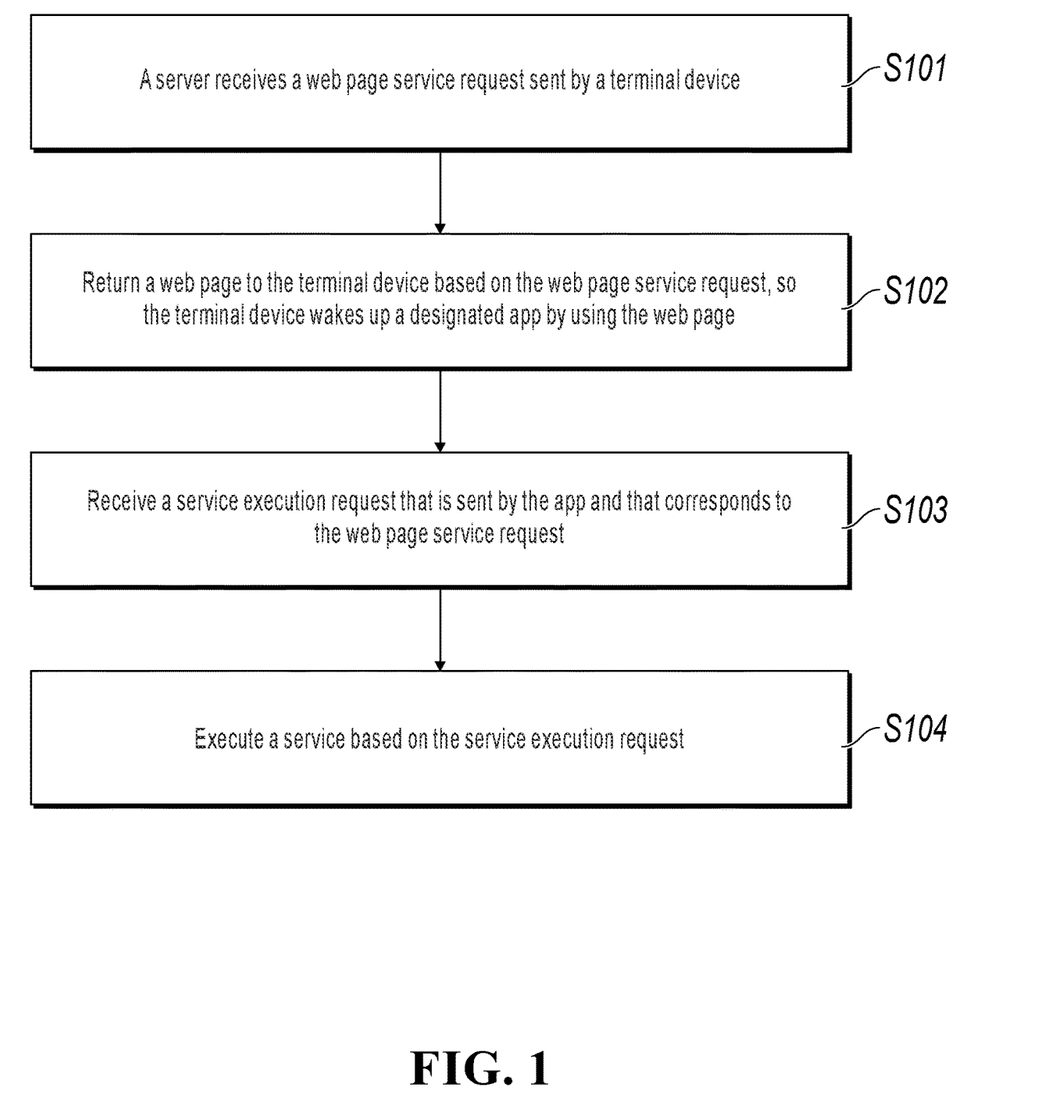
FIG. 1 illustrates a service execution process, according to an implementation of the present application.

FIG. 1 illustrates a service execution process, according to an implementation of the present application. The service execution process includes the following steps:

S101. A server receives a web page service request sent by a terminal device.

In the implementation of the present application, not all service requests received by the server come from web page services, and the present application aims to resolve a problem of low web page service execution efficiency on a terminal device. Therefore, when receiving a service request, the server can first determine that the service request is a web page service request, and then continue to execute subsequent steps. The web page service request in the present application is sent by a browser or an app having a browser kernel to the server in a form of a web page. The web page service request is used to invoke, from the server, a web page used to execute a corresponding service.

In addition, the web page service request is usually a service request initiated by the terminal device by using a third-party platform. That is, when a user logs in to an account of the third-party platform from the terminal device and initiates a web page service request to the server by using the account, the terminal device sends the web page service request to the server by using the third-party platform. Therefore, the server can receive the web page service request that is sent by the terminal device by using the third-party platform.

It is worthwhile to note that the web page service request in the present application can be a web page order payment request. The following is described by using an example with the web page service request being a web page order payment request. In addition, the terminal device in the present application can be a mobile device such as a mobile phone or a tablet. The server can be a standalone device or a system including a plurality of devices.

For example, Mr. Wang logs in to account i of e-commerce platform A (that is, a third-party platform) in a browser on a mobile phone, and initiates an order transaction on e-commerce platform A by using account i in the browser. Assume that transaction services on e-commerce platform A need to be completed by payment server a. When Mr. Wang initiates the order transaction by using account i, the payment server can receive, through an interface with e-commerce platform A, a request for invoking a web page order payment page (that is, a web page service request) sent by the browser on Mr. Wang's mobile phone.

S102. Return a web page to the terminal device based on the web page service request, so the terminal device wakes up a designated app by using the web page.

In the implementation of the present application, after receiving the web page service request, the server can parse the web page service request to determine service parameters, and the service parameters include a service identifier (ID). Then the server returns a web page including the service ID to the terminal device. The service parameters can include a service type, a service attribute, etc. in addition to the service ID. Certainly, in addition to the service ID, the web page can further carry another service parameter such as the service type.

The web page in the present application can be complied by using Hyper Text Markup Language 5 (HTML5) or another type of web page code.

Further, when receiving the web page service request by using the third-party platform, the server can return the web page including the service ID to the terminal device by using the third-party platform.

The following is described still by using the example with the web page service request being a web page order payment request. The server can first parse the web page order payment request to determine order payment parameters needed for executing the order payment service, such as an order ID, an order type, a transaction amount, a payment channel, information about transaction parties, a service type, an operating system of the terminal device, a MAC address of the terminal device, a network type of the terminal device, etc. In the present application, the order payment service is executed by the designated app on the terminal device rather than the web page. Therefore, the terminal device can include only the order ID (that is, the service ID) in the web page to be returned to the terminal device, and return the web page to the terminal device. Because the server receives the web page order payment request, the web page returned to the terminal device can be a payment routing page.

In addition, besides the service ID in the web page, the server can further include code used to wake up the designated app in the web page, to allow the designated app on the terminal device to execute the order payment service. As such, the terminal device loads the code when running the web page, to wake up the designated app to execute the service. The code in the present application includes but is not limited to JavaScript code. Specifically, the code included in the web page can include an ID of the app that needs to be woken up, and the ID is used to wake up the designated app.

In the previously described example, assume that payment server a determines, based on the request for invoking the web page order payment page, the order payment parameters needed for executing the order payment service, as illustrated in Table 1.

TABLE 1

| Article name | Blue crystal sweater chain |
| --- | --- |
| Order ID | 008XXXXX |
| Order type | From a browser app on a mobile phone |
| Transaction amount | ¥1 |
| Payment channel | Online banking, quick payment, or YU'E BAO |
| Buyer information | Account i |
| Seller information | Platform A |
| Operation information | The designated app exits after the transaction ends, and the browser returns to a designated page. |
| Service type | Payment service |
| Operating system of the terminal device | Android 4.4 |
| MAC address of the terminal device | 08:00:20:0A:8C:6D |
| Network type of the terminal device | CDMA2000 |

In this case, payment server a first includes the order ID illustrated in Table 1 and JavaScript code used to wake up a payment app in the payment routing page, and returns the payment routing page to the terminal device. The returned payment routing page is shown in FIG. 2.

Figure 2:
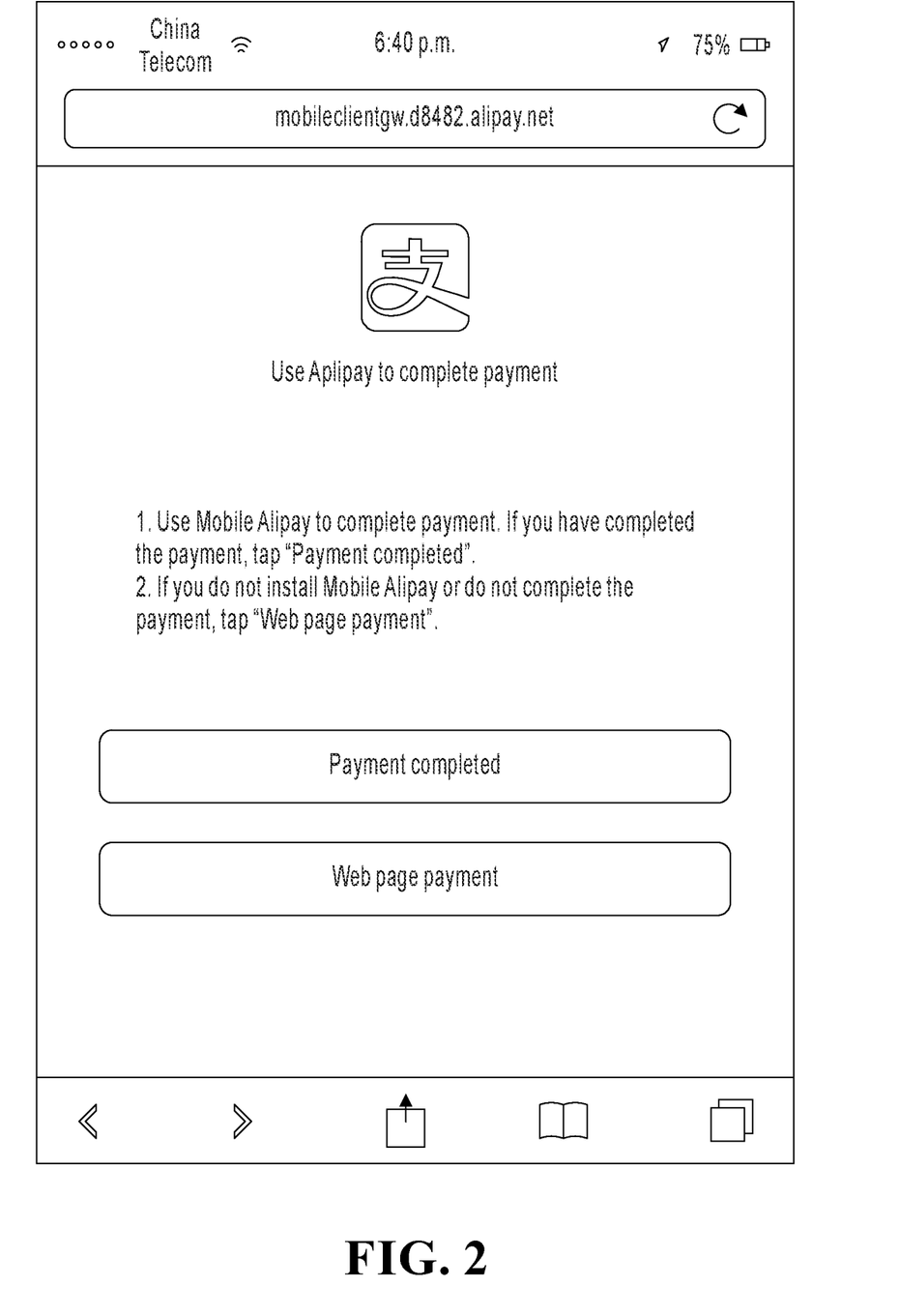
FIG. 2 is a schematic diagram illustrating a payment routing page returned by a server to a terminal device, according to an implementation of the present application.

FIG. 2 is a schematic diagram illustrating a payment routing page returned by a server to a terminal device, according to an implementation of the present application. The payment routing page includes two operation options: Payment completed and Web page payment. After completing payment, a user can tap the operation option of "Payment completed" to obtain a payment result. A user who does not want to or cannot use the payment app can tap the operation option of "Web page payment" to stay in the browser, and complete payment by using a payment web page sent by payment server a to the browser.

Further, if the payment app (that is, the designated app) is installed on the mobile phone, after running the payment routing page and loading the JavaScript code included in the payment routing page, the browser can further send a wakeup instruction to the payment app to wake up the payment app.

S103. Receive a service execution request that is sent by the app and that corresponds to the web page service request.

In the implementation of the present application, after the designated app is woken up, a service execution request including the service ID can be sent based on the service ID included in the web page. The service execution request, including the service ID, is the service execution request corresponding to the web page service request. The service execution request described in the present application is sent by a non-browser app that is provided by the server and installed on the terminal device. The designated app can be a client software program.

In the present application, because there is usually a default login account in an app that needs to perform account login (that is, an account that the app automatically logs in to upon startup), the designated app can log in to a default account after being woken up. The service can be executed subsequently by using the account.

In the previously described example, if a default login account of the payment app is account ii, payment server a can receive a request for executing the order payment service sent by the payment app based on account ii.

S104. Execute a service based on the service execution request.

In the previously described example, payment server a receives the request for executing the order payment service sent by the payment app based on account ii, and the request for executing the order payment service also includes the order ID. Therefore, complete order payment parameters illustrated in Table 1 can be determined based on the order ID. The payment service can be executed by using account ii based on the complete order payment parameters.

According to the method, after receiving the web page service request sent by the terminal device, the server returns the web page to the terminal device to wake up the designated app and allow the designated app to send the service execution request corresponding to the web page service request. Eventually, the server executes the service based on the service execution request. Compared with an existing method, in the method provided in the present application, because the app can automatically log in to the default account, the user does not need to log in to the account when executing the web page service request. As such, user operations are more convenient. In addition, more types of operations can be executed in the designated app compared with operations executed on the web page displayed in the browser (e.g. fingerprint recognition that is not supported on the web page of the browser can be implemented by the payment app). Thus, the service execution method described in the present application is more flexible and secure.

Therefore, according to the method provided in the present application, user operations can be more convenient, service execution can be more secure, and service execution efficiency can be higher for a web page service execution request initiated by using a web page of a browser.

Further, in actual applications, when the server executes the service in step S104, it is impracticable to execute the service based on only the service ID, and the server needs to execute the service based on the complete service parameters. Therefore, before executing the service, the server can obtain the complete service parameters (including the service ID) through parsing after receiving the web page service request sent by the terminal device in step S101, and save the complete service parameters to a session serving as a basis for receiving the web page service request. For ease of description, the session serving as the basis for receiving the web page service request by the server is referred to as a session corresponding to the service ID below. After obtaining the complete service parameters through parsing based on the web page service request, the server can use the session serving as the basis for receiving the web page service request by the server as the session corresponding to the service ID, and save the determined service parameters to the session corresponding to the service ID.

Subsequently, because the web page returned by the server to the terminal device includes only the service ID rather than the complete service parameters, the service ID included in the web page can be transmitted to the app when the terminal device runs the web page and wakes up the corresponding app. The app sends the service execution request including the service ID to the server. After receiving the service execution request, the server can determine, based on the service ID included in the service execution request, the session corresponding to the service ID, extract the complete service parameters from the determined session, and execute the service based on the extracted service parameters.

When executing the service based on the extracted complete service parameters, the server can first return the complete service parameters to the app. The app can display the complete service parameters to the user for confirmation. After the user confirms the complete service parameters, the app can send confirmation information to the server. Then the server executes the service based on the service parameters.

In addition, after the app sends the confirmation information to the server to allow the server to execute the service, the terminal device can return to the browser graphical user interface. In this case, the web page displayed in the browser is the web page returned by the server to the terminal device in step S102. When the web page is the web page shown in FIG. 2, the user can tap the operation option of "Payment completed" shown in FIG. 2, so the browser sends query information for querying a service result to the server, and displays a service execution result page returned by the server. As such, the user can determine a service execution result of the web page service execution request initiated by using the browser in step S101.

Further, in the present application, in addition to the method for obtaining the service result by clicking the operation option of "Payment completed" by the user, the browser can run the web page received in step S102, and send service result query information for the web page service request to the server. After executing the service based on the service execution request in step S104, the server can return a query result for the service result query information, so the browser can actively obtain the service result query information. The terminal device can send the service result query information to the server at a fixed interval or at a predetermined time point. A method for sending the service result query information to the server is not limited in the present application.

Figure 3:
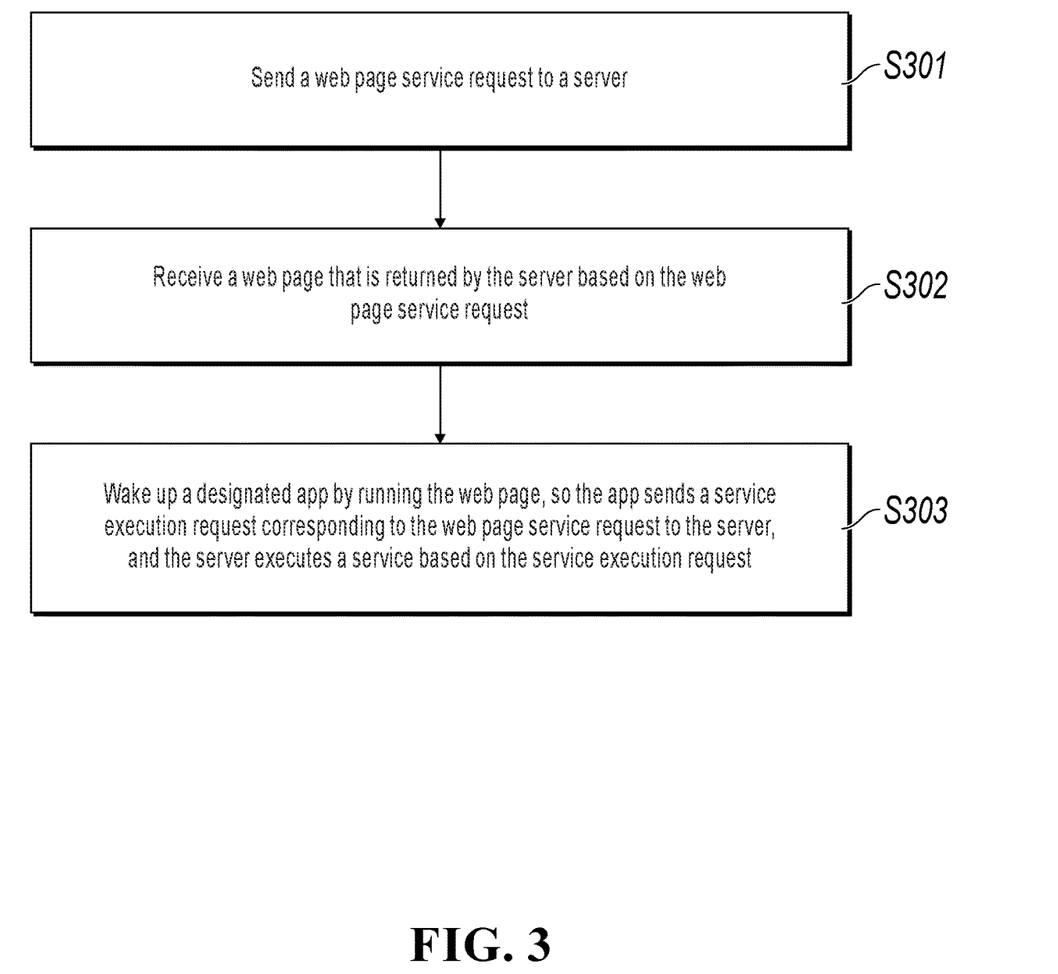
FIG. 3 illustrates a service execution process corresponding to FIG. 1, according to an implementation of the present application.

Based on the service execution process shown in FIG. 1, an implementation of the present application further provides another service execution process, as shown in FIG. 3.

FIG. 3 illustrates a service execution process, according to an implementation of the present application. The service execution process includes the following steps:

S301. Send a web page service request to a server.

In the implementation of the present application, a browser or an app having a browser kernel on a terminal device sends the web page request to the server. The following is described by using a browser as an example. The web page service request is sent by the browser on the terminal device to the server in a form of a web page. The web page service request is used to invoke, from the server, a web page used to execute a corresponding service.

In addition, the web page service request is usually a service request initiated by the browser by using a third-party platform. When a user logs in to an account of the third-party platform from the browser and initiates a web page service request to the server by using the account, the server receives, by using the third-party platform, the web page service request sent by the browser. Therefore, the browser can send the web page service request to the server by using the third-party platform.

S302. Receive a web page that is returned by the server based on the web page service request.

In the implementation of the present application, after receiving the web page service request, the server can parse the web page service request to determine service parameters, and the service parameters include a service ID. Then the server returns a web page including the service ID to the browser that sends the web page service request in step S301. The service parameters can include a service type, a service attribute, etc. in addition to the service ID.

In addition, because the browser sends the web page service request to the server by using the third-party platform, the browser can also receive the web page that is returned by the server and that includes the service ID by using the third-party platform.

S303. Wake up a designated app by running the web page, so the app sends a service execution request corresponding to the web page service request to the server, and the server executes a service based on the service execution request.

In the implementation of the present application, after receiving the web page returned by the server, the browser runs the web page to load JavaScript code included in the web page, wake up the designated app to execute the service, and transmit the service ID included in the web page to the designated app, so the designated app sends the service execution request to the server based on the service ID.

Figure 4:
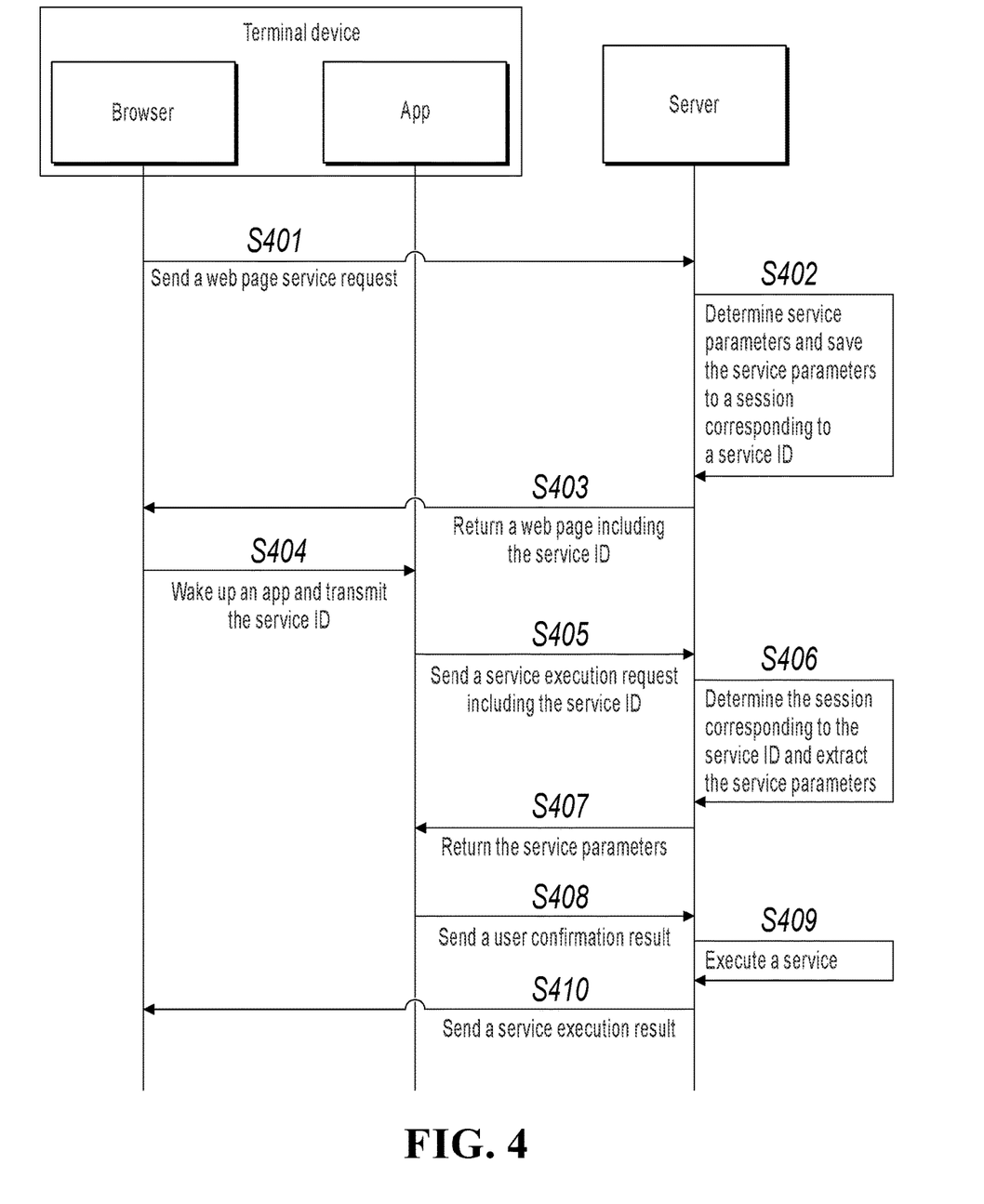
FIG. 4 is a flowchart illustrating service execution details, according to an implementation of the present application.

FIG. 4 is a flowchart illustrating service execution details, according to an implementation of the present application. The flowchart includes the following steps:

S401. A browser sends a web page service request to a server.

S402. The server determines service parameters based on the web page service request, and save the service parameters to a session corresponding to a service ID.

S403. The server returns a web page including the service ID to the browser.

S404. The browser wakes up a designated app by using the web page, and transmits the service ID to the app.

S405. The app sends a service execution request including the service ID to the server based on the service ID.

S406. The server determines the corresponding session based on the service ID in the service execution request, and extracts the service parameters.

S407. The server returns complete service parameters to the app.

S408. The app displays the complete service parameters to a user for confirmation, and sends a user confirmation result to the server.

S409. The server executes a service based on the complete service parameters after receiving the user confirmation result.

S410. The server sends a service execution result to the browser after executing the service.

Figure 5:
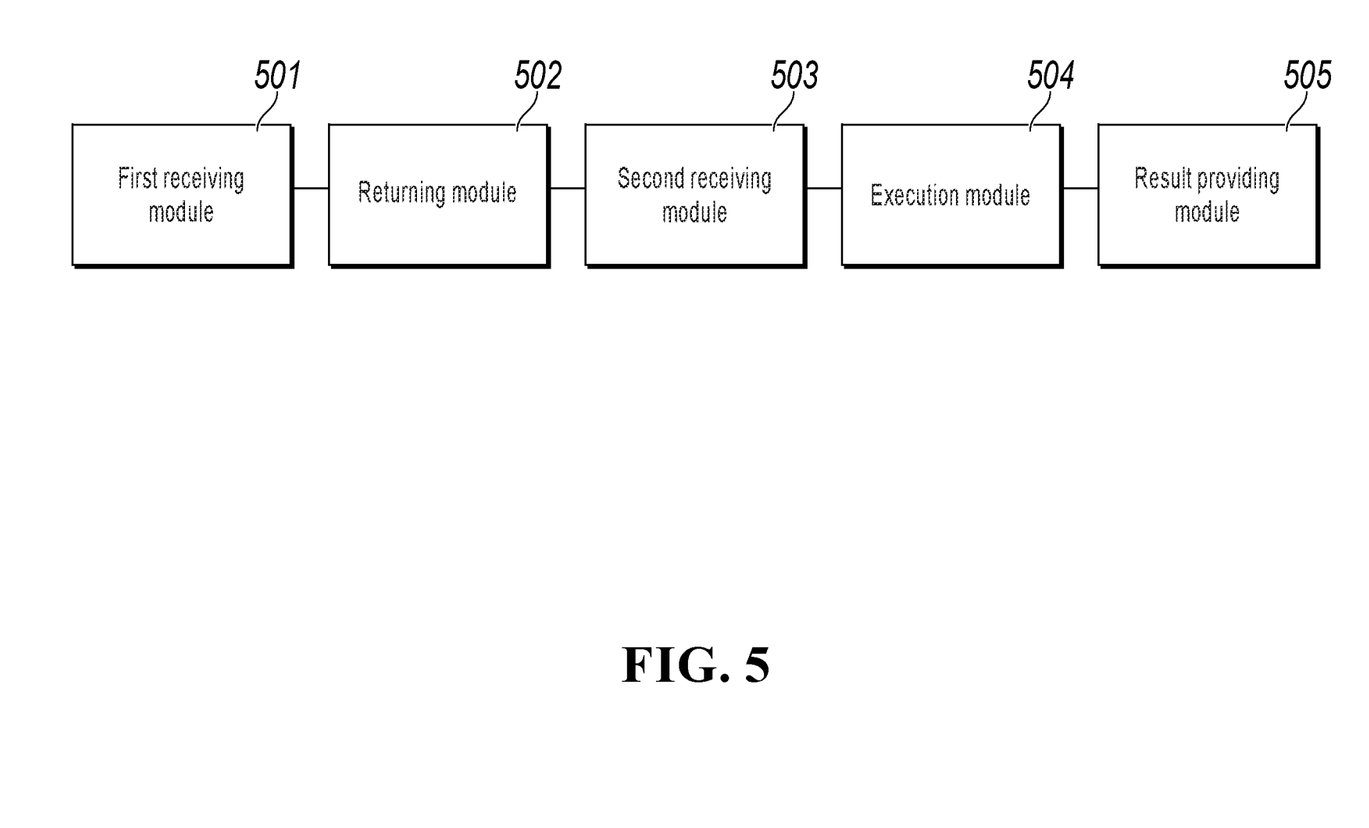
FIG. 5 is a schematic structural diagram illustrating a service execution device, according to an implementation of the present application.

Based on the same idea as the method shown in FIG. 1, an implementation of the present application further provides a service execution device, as shown in FIG. 5.

FIG. 5 is a schematic structural diagram illustrating a service execution device, according to an implementation of the present application. The service execution device includes the following: a first receiving module 501, configured to receive a web page service request sent by a terminal device; a returning module 502, configured to return a web page to the terminal device based on the web page service request, so the terminal device wakes up a designated app by using the web page; a second receiving module 503, configured to receive a service execution request that is sent by the app and that corresponds to the web page service request; and an execution module 504, configured to execute a service based on the service execution request.

The returning module 502 is configured to determine service parameters based on the web page service request, where the service parameters include a service ID; and return a web page including the service ID to the terminal device.

The second receiving module 503 is configured to receive a service execution request that is sent by the app based on the service ID and that corresponds to the web page service request.

The execution module 504 is further configured to, before executing the service based on the service request, use a session serving as a basis for receiving the web page service request as a session corresponding to the service ID; and save the determined service parameters to the session corresponding to the service ID.

The execution module 504 is configured to determine, based on the service ID included in the service execution request, the session corresponding to the service ID, extract the service parameters from the determined session, and execute the service based on the extracted service parameters.

The first receiving module 501 is configured to receive a web page service request that is sent by the terminal device by using a third-party platform.

The returning module 502 is configured to return a web page to the terminal device by using the third-party platform based on the web page service request.

The device further includes a result providing module 505, configured to receive service result query information sent by the terminal device for the web page service request, and return a query result for the service result query information after the execution module 504 executes the service based on the service execution request.

The service execution device shown in FIG. 5 can be located in a standalone server or in a system including a plurality of servers.

Figure 6:
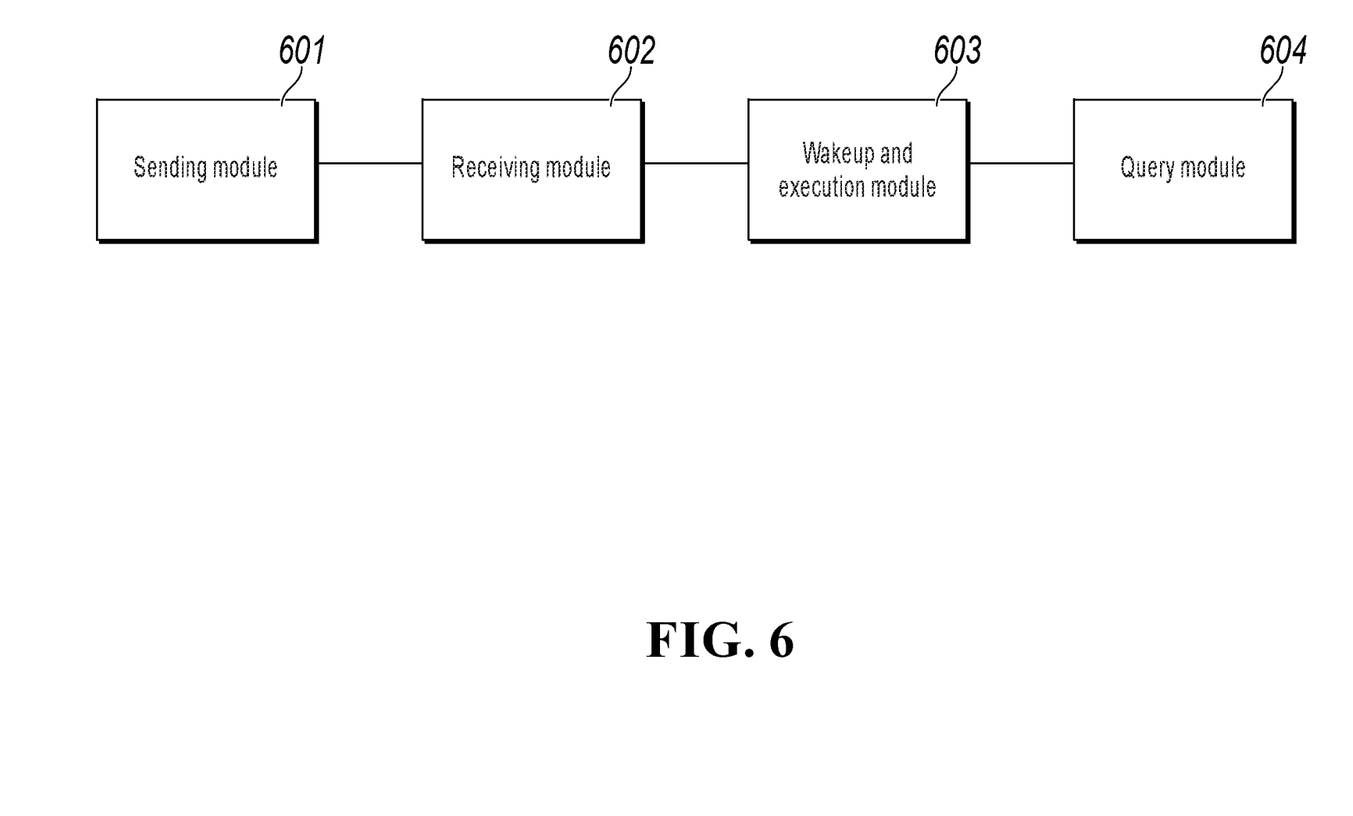
FIG. 6 is a schematic structural diagram illustrating a service execution device corresponding to FIG. 5, according to an implementation of the present application.

Based on the same idea as the method shown in FIG. 3, an implementation of the present application further provides a service execution device, as shown in FIG. 6.

FIG. 6 is a schematic structural diagram illustrating a service execution device, according to an implementation of the present application. The service execution device includes the following: a sending module 601, configured to send a web page service request to a server; a receiving module 602, configured to receive a web page that is returned by the server based on the web page service request; and a wakeup and execution module 603, configured to wake up a designated app by running the web page, so the app sends a service execution request corresponding to the web page service request to the server, and the server executes a service based on the service execution request.

The receiving module 602 is configured to receive a web page that includes a service ID and that is returned by the server based on the web page service request.

The wakeup and execution module 603 is configured to run the web page to wake up the designated app and transmit the service ID to the app, so the app sends a service execution request to the server based on the service ID.

The sending module 601 is configured to send a web page service request to the server by using a third-party platform.

The receiving module 602 is configured to receive, by using the third-party platform, the web page that is returned by the server based on the web page service request.

The device further includes a query module 604, configured to run the web page to send service result query information for the web page service request to the server, and receive a query result returned by the server for the service result query information, where the query result is returned for the service result query information after the server executes the service based on the service execution request.

The service execution device shown in FIG. 6 can be located in various terminal devices, such as a mobile phone, a personal computer (PC), and a tablet.

In a typical configuration, a computing device includes one or more central processing units (CPUs), an input/output interface, a network interface, and a memory.

The memory can take a form of a volatile memory, a random access memory (RAM), and/or a non-volatile memory in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device, or any other non-transmission media that can be configured to store information that a computing device can access. As defined in the present specification, the computer readable medium does not include transitory media such as a modulated data signal and carrier.

Moreover, it is worthwhile to note that the terms "include", "comprise", or their any other variants are intended to cover a non-exclusive inclusion, so a process, a method, an article, or a device that includes a list of elements not only includes those elements but also includes other elements that are not expressly listed; or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use hardware only implementations, software only implementations, or implementations with a combination of software and hardware. Moreover, the present application can use a computer program product that is implemented on one or more computer-usable storage media (including but not limited to a disk memory, a CD-ROM, an optical memory, etc.) that include computer-usable program code.

The above-mentioned descriptions are merely the implementations of the present application, but are not intended to limit the present application. A person skilled in the art can make various modifications and variations to the present application. Any modification, equivalent replacement, or improvement made without departing from the spirit and principle of the present application shall fall within the scope of the claims of the present application.

Figure 7:
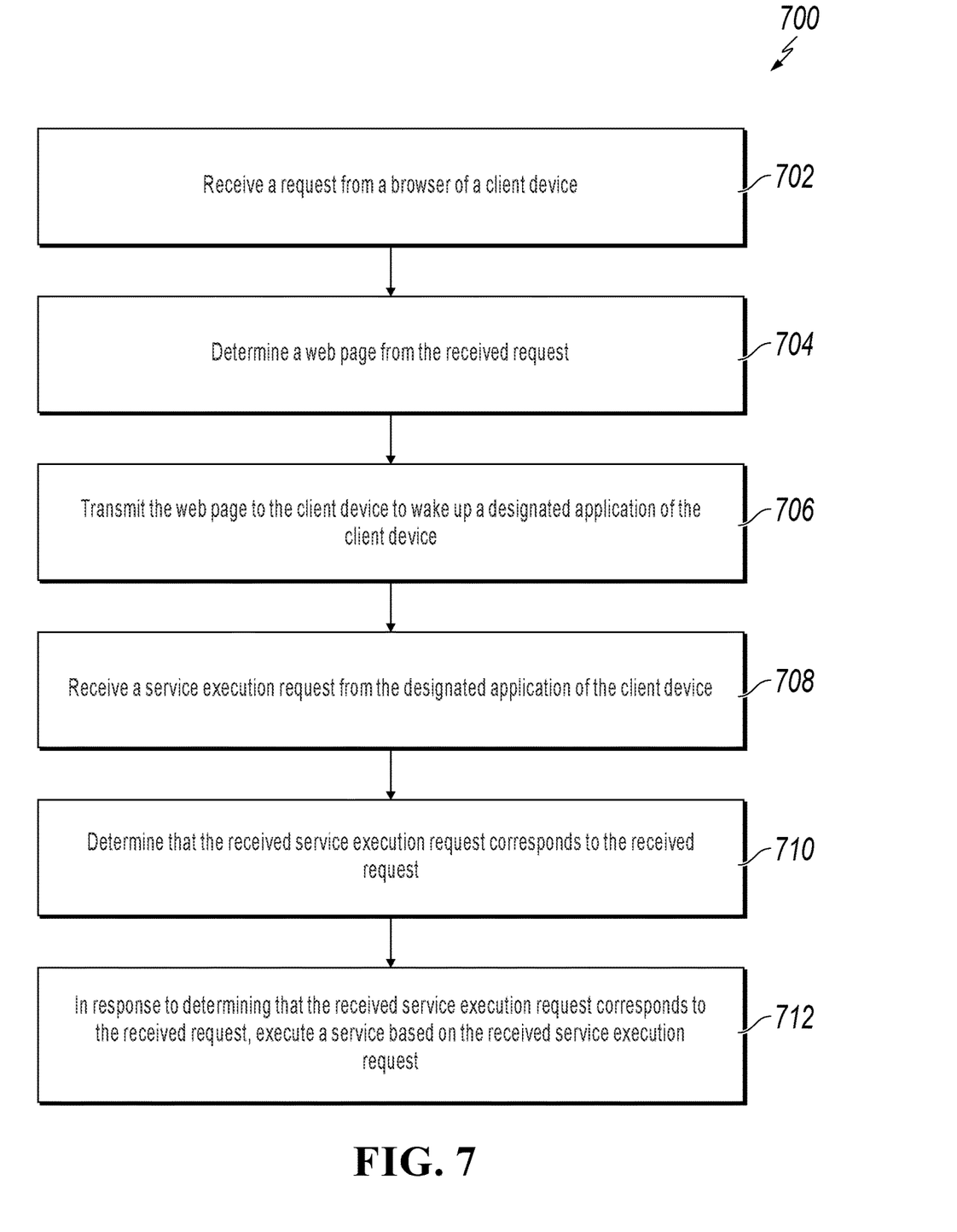
FIG. 7 is a flowchart illustrating an example of a computer-implemented method for a service execution method, according to an implementation of the present disclosure.

FIG. 7 is a flowchart illustrating an example of a computer-implemented method 700 for a service execution method, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a server receives a request from a browser of a client device. For example, the request can be a web page service request or an application request. A client device, such as a laptop or mobile device, can transmit the request from a browser or an application having a browser kernel. In other implementations, a user can transmit the request from a third-party platform that utilizes a browser on the client device. For example, when a user logs in to his or her account on the third-party platform, the user can transmit a request from a browser on the third-party platform to the server. For example, a user logs in to a financial website on his/her client device using a browser to initiate a financial transaction by interacting with his/her account on the financial website. The browser can transmit a request to a server for initiating the financial transaction that displays a web page on the user's client device in response to initiating the financial transaction. From 702, method 700 proceeds to 704.

At 704, the server determines a web page from the received request. In particular, the server parses the received request to determine the particular web page requested for by the user. The server determines the particular web page requested for by the user by accessing one or more service parameters that can include, for example, a service identifier (ID) identifying the web page, a service type, and a service attribute, an operating system of the client device, a MAC address of the client device, and a network type of the client device. In some cases, the service ID can include a URL link, an identification number, or a short code representing the received request. The service type can indicate the type of request, such as, a financial transaction request, a data retrieval request, a webpage retrieval request, or a login attempt request.

Once the server parses the data from the received request to determine the particular web page, the server stores the parsed data from the received request with session data in memory. The server creates persisted session data, based on the received request from the client device, which indicates state information between the client device and the server. The persisted state information indicates a continuing conversation between the client device and the server initiated by the received request. For example, using the service ID retrieved from the received request, the server creates a session for the client device and stores the parsed data with the created session in memory. This allows the server to correspond any future communication with the client device that includes the service ID with the parsed data stored in memory using the session. Additionally, the server retrieves a webpage using the service ID included in the received request. For example, if the service ID includes a URL link, the server can retrieve the web page from the INTERNET using the URL link. From 704, method 700 proceeds to 706.

At 706, the server transmits the web page to the client device to wake up a designated application of the client device. The server generates data to include in the web page to transmit back to the client device. The data can include the service ID retrieved from the received request and data to instruct the client device to wake up a designated application for executing a particular process or service. For example, as shown in Table 1, the order ID or service ID includes "008XXXXX" and the order type includes "From a browser app on a mobile phone." Using the order ID, the order type, and instructions to wake up a payment application in a payment routing page, the server returns the payment routing page to the terminal device, as shown in FIG. 2. Continuing with the payment application, if the payment application is installed on the client device corresponding to the payment routing page transmitted by the server, the payment routing page can transmit an instruction to wake up the payment application. The instruction from the payment routing page to the payment application includes the service ID transmitted by the server for tracking purposes. From 706, method 700 proceeds to 708.

At 708, the server receives a service execution request from the designated application of the client device. After the designated application is awoken on the user's client device, the client device transmits the service execution request, including the server ID, to the server. In particular, the designated application of the client device can transmit the service execution request to the server. The server can receive the service execution request and determine a corresponding stored session from the service execution request. From 708, method 700 proceeds to 710.

At 710, the server determines that the received service execution request corresponds to the received request. The server receives the service execution request and determines the corresponding stored session. In particular, the server first retrieves a service ID found in the service execution request. For the example, the service ID includes a URL link, an identification number, or a short code representing the received request. Once the server extracts the service ID from the service execution request, the server compares the extracted service ID to a service ID corresponding to each session stored in memory. The server can store session data for each client device the server is in current communications with in a period of time. Session data corresponding to each client device can include one or more stored service parameters. Once the server matches the extracted service ID to a service ID stored in memory, the server extracts one or more session parameters corresponding to the matched service ID stored in memory. By matching the extracted service ID to a service ID stored in the memory, the server can determine that the request received in 702 matches the service execution request because both include the same server ID. From 710, method 700 proceeds to 712.

At 712, in response to the server determining that the received service execution request corresponds to the received request, the server executes a service based on the received service execution request. Once the server determines that the extracted service ID matches a service ID found in memory corresponding to session data, the server uses parameters extracted from the session data to execute a service based on the extracted service parameters.

In some implementations, when the server executes the service based on the extracted service parameters, the server can transmit the extracted service parameters to the designated application on the client device for user confirmation. The client device can display the extracted service parameters to the user for confirmation. In response to the user confirming or denying the extracted service parameters, the client device transmits the user's response to the server. If the user confirmed the extracted service parameters and transmits the confirmation to the server, the then server executes the service. Otherwise, if the user denies the extracted service parameters, then the server does not execute the service.

Once the user confirms the extracted service parameters and transmits the confirmation to the server, the client device turns its display to the web page provided by the server in 706, such as the web page shown in FIG. 2. The user can interact with the displayed web page to request a service execution result after the server executes the service. Therefore, once the server executes the service, the server can return server results to the client device for user review. After 712, method 700 stops.

The features of the present application seek to execute a service by displaying a web page through a browser. For example, the system seeks to execute this service by receiving a request from a browser of a client device; determining a web page from the received request; transmitting the web page to the client device to wake up a designated application of the client device; receiving a service execution request from the designated application of the client device; determining that the received service execution request corresponds to the received request; and, in response to determining that the received service execution request corresponds to the received request, execute a service based on the received service execution request. By performing this method, when the service is executed by using the web page, the designated application can be simply and effectively woken up, and the designated application and the server can complete service execution together. As such, user operations are more convenient, and service execution efficiency is higher.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server and from a browser of a client device communicatively coupled to the server, a request to invoke a web page;
   extracting, by the server, one or more service parameters from the request by parsing the request, wherein the one or more service parameters comprise a service identifier (ID);
   retrieving, by the server, the web page, wherein the web page comprises the service ID;
   transmitting, by the server, the web page to the client device to wake up a designated application of the client device;
   receiving, by the server, a service execution request from the designated application of the client device, wherein the service execution request comprises the service ID;
   determining, by the server, that the service execution request corresponds to the request; and
   in response to determining that the service execution request corresponds to the request, executing, by the server, a service based on the service execution request.

2. The computer-implemented method of claim 1, wherein the request from the browser of the client device comprises a web page service request.

3. The computer-implemented method of claim 1, wherein retrieving the web page comprises:
   storing in memory the one or more service parameters with a session corresponding to the service ID from the one or more service parameters; and
   retrieving the web page using the service ID.

4. The computer-implemented method of claim 3, wherein the one or more service parameters further comprise a service type corresponding to the web page, and a service attribute corresponding to the web page, and wherein the service type indicates a type of the request, the type of the request being a financial transaction request, a data retrieval request, a webpage retrieval request, or a login attempt request.

5. The computer-implemented method of claim 1, wherein transmitting the web page to the client device to wake up the designated application of the client device comprises:
   generating, by the server, data that instructs the browser to wake up the designated application of the client device to incorporate in the web page;
   incorporating, by the server, the data and the service ID in the web page to transmit to the client device; and
   transmitting, by the server, the web page to the browser of the client device.

6. The computer-implemented method of claim 3, wherein the service ID in the service execution request indicates that the browser transmitted the service ID from the one or more service parameters to the designated application on the client device to wake up the designated application.

7. The computer-implemented method of claim 3, wherein determining that the service execution request corresponds to the request comprises:
comparing, by the server, the service ID in the service execution request to the service ID corresponding to the session stored in memory;
determining, by the server, that the service ID in the service execution request matches the service ID corresponding to the session stored in memory;
retrieving, by the server, the one or more service parameters stored with the session; and
transmitting, by the server, the one or more service parameters stored with the session to the client device for user confirmation.

8. The computer-implemented method of claim 7, wherein, in response to determining that the service execution request corresponds to the request, executing the service based on the service execution request, which comprises:
receiving, by the server, a confirmation from the client device indicating that a user confirmed the one or more service parameters stored with the session; and
in response to receiving the confirmation from the client device:
executing, by the server, the service based on the service execution request; and
transmitting, by the server, a service execution result to the browser.

9. A non-transitory, computer-readable medium stng one or more instructions executable by a computer system to perform operations comprising:
receiving, by a server and from a browser of a client device communicatively coupled to the server, a request to invoke a web page;
extracting, by the server, one or more service parameters from the request by parsing the request, wherein the one or more service parameters comprise a service identifier (ID);
retrieving, by the server, the web page, wherein the web page comprises the service ID;
transmitting, by the server, the web page to the client device to wake up a designated application of the client device;
receiving, by the server, a service execution request from the designated application of the client device, wherein the service execution request comprises the service ID;
determining, by the server, that the service execution request corresponds to the request; and
in response to determining that the service execution request corresponds to the request, executing, by the server, a service based on the service execution request.

10. The non-transitory, computer-readable medium of claim 9, wherein the request from the browser of the client device comprises a web page service request.

11. The non-transitory, computer-readable medium of claim 9, wherein retrieving the web page comprises:
storing in memory the one or more service parameters with a session corresponding to the service ID from the one or more service parameters; and
retrieving the web page using the service ID.

12. The non-transitory, computer-readable medium of claim 11, wherein the one or more service parameters further comprise a service type corresponding to the web page, and a service attribute corresponding to the web page, and wherein the service type indicates a type of the request, the type of the request being a financial transaction request, a data retrieval request, a webpage retrieval request, or a login attempt request.

13. The non-transitory, computer-readable medium of claim 9, wherein transmitting the web page to the client device to wake up the designated application of the client device comprises:
generating, by the server, data that instructs the browser to wake up the designated application of the client device to incorporate in the web page;
incorporating, by the server, the data and the service ID in the web page to transmit to the client device; and
transmitting, by the server, the web page to the browser of the client device.

14. The non-transitory, computer-readable medium of claim 11, wherein the service ID in the service execution request indicates that the browser transmitted the service ID from the one or more service parameters to the designated application on the client device to wake up the designated application.

15. The non-transitory, computer-readable medium of claim 11, wherein determining that the service execution request corresponds to the request comprises:
comparing, by the server, the service ID in the service execution request to the service ID corresponding to the session stored in memory;
determining, by the server, that the service ID in the service execution request matches the service ID corresponding to the session stored in memory;
retrieving, by the server, the one or more service parameters stored with the session; and
transmitting, by the server, the one or more service parameters stored with the session to the client device for user confirmation.

16. The non-transitory, computer-readable medium of claim 15, wherein, in response to determining that the service execution request corresponds to the request, executing the service based on the service execution request, which comprises:
receiving, by the server, a confirmation from the client device indicating that a user confirmed the one or more service parameters stored with the session; and
in response to receiving the confirmation from the client device:
executing, by the server, the service based on the service execution request; and
transmitting, by the server, a service execution result to the browser.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server and from a browser of a client device communicatively coupled to the server, a request to invoke a web page;
extracting, by the server, one or more service parameters from the request by parsing the request, wherein the one or more service parameters comprise a service identifier (ID);
retrieving, by the server, the web page, wherein the web page comprises the service ID;

transmitting, by the server, the web page to the client device to wake up a designated application of the client device;

receiving, by the server, a service execution request from the designated application of the client device, wherein the service execution request comprises the service ID;

determining, by the server, that the service execution request corresponds to the request; and in response to determining that the service execution request corresponds to the request, executing, by the server, a service based on the service execution request.

18. The computer-implemented system of claim 17, wherein the request from the browser of the client device comprises a web page service request.

19. The computer-implemented system of claim 17, wherein retrieving the web page comprises:

storing in memory the one or more service parameters with a session corresponding to the service ID from the one or more service parameters; and retrieving the web page using the service ID.

20. The computer-implemented system of claim 19, wherein the one or more service parameters further comprise a service type corresponding to the web page, and a service attribute corresponding to the web page, and wherein the service type indicates a type of the request, the type of the request being a financial transaction request, a data retrieval request, a webpage retrieval request, or a login attempt request.

* * * * *

UNITED STATES PATENT AND TRADEMARK OFFICE
CERTIFICATE OF CORRECTION

PATENT NO. : 11,755,679 B2
APPLICATION NO. : 17/825113
DATED : September 12, 2023
INVENTOR(S) : Chao Wu It is certified that error appears in the above-identified patent and that said Letters Patent is hereby corrected as shown below:

In the Claims

In Column 17, Claim 9, Line 31, delete "stng" and insert -- storing --, therefor.

Signed and Sealed this
Thirtieth Day of January, 2024

Katherine Kelly Vidal
*Director of the United States Patent and Trademark Office*